US006332316B1

(12) United States Patent
Morimoto et al.

(10) Patent No.: US 6,332,316 B1
(45) Date of Patent: Dec. 25, 2001

(54) HYDRAULIC CONTROL DEVICE FOR WORKING VEHICLE

(75) Inventors: Katsuyuki Morimoto, Kawagoe; Yasuhiko Nozawa, Kawajima-machi; Hiroya Saito, Kawagoe, all of (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/465,268

(22) Filed: Dec. 17, 1999

(30) Foreign Application Priority Data

Dec. 21, 1998 (JP) ................................................ 10-376126

(51) Int. Cl.[7] ...................................................... F16D 31/02
(52) U.S. Cl. ................................................ 60/421; 60/422
(58) Field of Search ............................ 60/421, 422, 430, 60/468

(56) References Cited

U.S. PATENT DOCUMENTS 5,950,428 * 9/1999 Nam et al. ............................ 60/421

FOREIGN PATENT DOCUMENTS

09217384 A * 8/1997 (JP) .
2740757 1/1998 (JP) .

* cited by examiner

*Primary Examiner*—F. Daniel Lopez
*Assistant Examiner*—Thomas E. Lazo
(74) *Attorney, Agent, or Firm*—Armstrong, Westerman, Hattori, McLeland & Naughton, LLP.

(57) ABSTRACT

A hydraulic control device for a working vehicle capable of enhancing excavating ability even when earth to be excavated is hard is provided. For this end, the device includes an unloading valve (14) for allowing discharge oil from a second pump (5) to be freely drained, a pressure increasing valve (22, 24) connected to a working machine circuit (9*a*) downstream of the junction of a working machine circuit (9, 9*a*) and an assistance circuit (13) for increasing a set pressure of pressure oil in the downstream working machine circuit (9*a*), a check valve (17) for checking back-flow of the pressure oil in the downstream working machine circuit (9*a*) toward the unloading valve (14), and a controller (16) for draining discharge oil from the second pump (5) by the unloading valve (14) and increasing the set pressure of the downstream working machine circuit (9*a*) by the pressure increasing valve (22, 24) when a transmission (3) is shifted down from a second speed gear to a first speed gear on receipt of an actuating signal from a shift-down switch (15).

6 Claims, 7 Drawing Sheets

HYDRAULIC CONTROL DEVICE FOR WORKING VEHICLE

TECHNICAL FIELD

The present invention relates to a hydraulic control device for a working vehicle capable of adjusting lift force and tractive force of a working machine of the working vehicle such as a wheel loader according to working conditions.

BACKGROUND ART

Japanese Patent No. 2740757, for example, is known as a conventional hydraulic control device for a working vehicle and has such a configuration as shown in FIG. 6. A prime mover 1 drives a transmission 3 for making a vehicle travel via a torque converter 2, and drives a first pump 4 and a second pump 5. A discharge opening of the first pump 4 is connected to a steering cylinder 8 via a steering circuit 6, a steering priority valve 7, and a steering changeover valve 8*a*. A discharge opening of the second pump 5 is connected to a working machine changeover valve 10 via a working machine circuit 9, 9*a*. An assistance circuit 13 into which part of discharge oil from the first pump 4 flows from the steering priority valve 7 is connected to the working machine circuit 9, 9*a*. The working machine changeover valve 10 is connected to working machine actuators such as a boom cylinder 11, a bucket cylinder 12, and the like. An unloading valve 14 for unloading discharge oil from the second pump 5 is connected to the working machine circuit 9. A check valve 17 for checking back-flow toward the unloading valve 14 is also connected to the working machine circuit 9 between a portion connected to the assistance circuit 13 and a portion connected to the unloading valve 14. When inputting an actuating signal from a shift-down switch 15 while the transmission 3 is in a second speed gear, a controller 16 outputs a signal for shifting down the transmission 3 to a first speed gear to the transmission 3 and outputs a signal for unloading the second pump 5 to the unloading valve 14.

According to the above configuration, when the shift-down switch 15 is operated during low speed work such as excavating work and while the transmission 3 is in the second speed gear, after inputting an actuating signal from the shift-down switch 15, the controller 16 shifts down the transmission 3 to the first speed gear and unloads the second pump 5 by means of the unloading valve 14. In this situation, only pressure oil discharged from the first pump 4 (the arrow painted over with black in FIG. 6) is supplied to the working machine changeover valve 10 via the steering circuit 6, the steering priority valve 7, the assistance circuit 13, and the working machine circuit 9*a*. At this time, pressure oil in the assistance circuit 13 and the working machine circuit 9*a* never flows into the unloading valve 14 owing to the check valve 17. Horse power of the prime mover 1 which becomes unnecessary by unloading the second pump 5 as described above is used for tractive horse power of the working vehicle, thereby increasing digging force of a bucket into earth. As a result, the quantity of earth scooped into the bucket is increased and working ability is enhanced.

According to the aforesaid prior art, tractive force can be increased by the force corresponding to motive power which becomes unnecessary by unloading the second pump 5. However, pressure of the first pump 4 remains unchanged, whereby sufficient working machine lift force such as bucket tilt force or the like can not be obtained. In this case, when earth to be excavated is soft, earth is easy to break even if working machine lift force Fv1 is small as shown in FIG. 7A. Therefore, if tractive force Fh is large, the quantity of earth scooped into the bucket increases, which is effective. However, when earth to be excavated is hard, the digging force of the bucket into the earth to be excavated can not be sufficiently obtained even if the tractive force Fh is increased as shown in FIG. 7B. Hence, the quantity of earth scooped into the bucket does not increase, thus lowering working efficiency. Moreover, a tire slips as shown by the arrow S, thereby causing a disadvantage that abrasion loss is increased, thus shortening the life of the tire. Accordingly, when earth to be excavated is hard, it is requested to increase the tractive force Fh and also increase the working machine lift force like Fv2. For this purpose, it is required to increase the quantity of earth scooped into the bucket while the earth is broken by repeatedly performing working machine operation such that bucket tilt force is put forth by rotating a bucket edge upward and that bucket lift force is put forth by lifting a boom to raise the bucket edge.

SUMMARY OF THE INVENTION

The present invention is made in view of the aforesaid disadvantages, and its object is to provide a hydraulic control device for a working vehicle capable of enhancing excavating ability to improve working efficiency even when earth to be excavated is hard and preventing tire slips to thereby lengthen the life of a tire.

To attain the above object, a first configuration of a hydraulic control device for a working vehicle according to the present invention is characterized in that a hydraulic control device for a working vehicle having a transmission, a first pump, and a second pump which are driven by a prime mover, a steering circuit for controlling discharge oil from the first pump by a steering priority valve and supplying the same preferentially to a steering changeover valve, a working machine circuit for supplying discharge oil from the second pump to a working machine changeover valve, an assistance circuit for making the remainder of discharge oil from the first pump controlled by the steering priority valve join the working machine circuit, and a shift-down switch for shifting down the transmission to a first speed gear when being operated while the transmission is in a second speed gear, includes

- an unloading valve, connected to the working machine circuit upstream of a junction of the working machine circuit and the assistance circuit, for allowing discharge oil from the second pump to be freely drained,
- a pressure increasing valve, connected to the working machine circuit downstream of the junction, for increasing a set pressure of pressure oil in the downstream working machine circuit,
- a check valve, provided in the upstream working machine circuit between a portion connected to the unloading valve and the junction, for checking back-flow of the pressure oil in the downstream working machine circuit toward the unloading valve, and
- a controller for draining discharge oil from the second pump by the unloading valve and increasing the set pressure of the downstream working machine circuit by the pressure increasing valve when the transmission is shifted down from the second speed gear to the first speed gear on receipt of an actuating signal from the shift-down switch.

According to the above configuration, when inputting an actuating signal from the shift-down switch while the transmission is in the second speed gear, the controller shifts down the transmission to the first speed gear, outputs a signal to the unloading valve to unload the second pump, and outputs a signal to the pressure increasing valve to raise the setting of pressure oil in the working machine circuit. At this time, the check valve checks back-flow of the pressure oil in the working machine circuit toward the unloading valve. Hence, tractive force can be increased by the force corresponding to the driving force of the second pump which becomes unnecessary as the result of unload out of prime mover power, and pressure oil in the working machine circuit is raised to thereby increase working machine lift force. Accordingly, even when earth and sand to be excavated are not fully broken by only digging the bucket into the earth and sand with tractive force since the earth to be excavated is hard, the tractive force is increased while working machine lift force such as boom lift force, bucket tilt force, and the like is increased, whereby the earth is fully broken and efficiently excavated, which leads to an increase in quantity of earth scooped into the bucket. As a result, excavating ability is enhanced, thus shortening the excavating time and improving working efficiency. If the total of increases in tractive force and working machine lift force required during work is smaller than the driving force of the second pump which becomes unnecessary as the result of unload, this difference in force can be saved in the prime mover power. Further, in excavation when earth and sand to be excavated are hard, the road surface is slippery, or the like, if the tractive force is increased while the working machine lift force is increased, and earth and sand to be excavated are efficiently broken to thereby increase the quantity of earth scooped into the bucket, abrasion loss due to tire slips is reduced, thus lengthening the life of a tire. Since discharge oil from the second pump is drained from the unloading valve, it never flows through the neutral position of the working machine changeover valve having larger flow path resistance than the unloading valve. Hence, power loss due to the flow path resistance of the working machine changeover valve is eliminated, thereby reducing an increase in oil temperature. Especially, a discharge quantity from the second pump is larger than that from the first pump, thus obtaining remarkable energy-saving effect.

A second configuration of a hydraulic control device for a working vehicle according to the present invention is characterized in that a hydraulic control device for a working vehicle having a transmission, a first pump, a second pump, and a third pump which are driven by a prime mover, a steering circuit for controlling discharge oil from the first pump by a steering priority valve and supplying the same preferentially to a steering changeover valve, a working machine circuit for supplying discharge oil from the second pump to a working machine changeover valve, an assistance circuit for making the remainder of discharge oil from the first pump controlled by the steering priority valve join the working machine circuit, a steering dedicated circuit for making discharge oil from the third pump join the steering circuit downstream of the steering priority valve, and a shift-down switch for shifting down the transmission to a first speed gear when being operated while the transmission is in a second speed gear, includes an unloading valve, connected to a circuit which connects a junction of the working machine circuit and the assistance circuit and the first pump and includes the assistance circuit, for allowing discharge oil from the first pump to be freely drained, a pressure increasing valve, connected to the working machine circuit downstream of the junction, for increasing a set pressure of pressure oil in the downstream working machine circuit, a check valve, provided in the connecting circuit between a portion connected to the unloading valve and the junction, for checking back-flow of the pressure oil in the downstream working machine circuit toward the unloading valve, and a controller for draining discharge oil from the first pump by the unloading valve and increasing the set pressure of the downstream working machine circuit by the pressure increasing valve when the transmission is shifted down from the second speed gear to the first speed gear on receipt of an actuating signal from the shift-down switch.

According to the above configuration, when inputting an actuating signal from the shift-down switch while the transmission is in the second speed gear, the controller shifts down the transmission to the first speed gear, outputs a signal to the unloading valve to unload discharge oil from the first pump, and outputs a signal to the pressure increasing valve to raise the setting of pressure oil in the working machine circuit. At this time, the check valve checks back-flow of the pressure oil in the working machine circuit toward the unloading valve. Hence, tractive force can be increased by the force corresponding to driving force of the first pump which becomes unnecessary in consequence of unload out of prime mover power, and pressure oil in the working machine circuit is raised to thereby increase working machine lift force. Accordingly, even when earth and sand to be excavated are not fully broken by only digging the bucket into the earth and sand with tractive force since the earth to be excavated is hard, the tractive force is increased while working machine lift force such as boom lift force, bucket tilt force, and the like is increased, whereby the earth is fully broken and efficiently excavated, which leads to an increase in quantity of earth scooped into the bucket. As a result, excavating ability is enhanced, thus shortening the excavating time and improving working efficiency. If the total of increases in tractive force and working machine lift force required during work is smaller than the driving force of the first pump which becomes unnecessary as the result of unload, this difference in force can be saved in the prime mover power. Further, in excavation when earth and sand to be excavated are hard, the road surface is slippery, or the like, if the tractive force is increased while the working machine lift force is increased, and earth and sand to be excavated are efficiently broken to thereby increase the quantity of earth scooped into the bucket, abrasion loss due to tire slips is reduced, thus lengthening the life of a tire. Since discharge oil from the first pump is drained from the unloading valve, it never flows through the neutral position of the working machine changeover valve having larger flow path resistance than the unloading valve. Hence, power loss due to the flow path resistance of the working machine changeover valve is eliminated, thereby reducing an increase in oil temperature.

Further, the unloading valve may have a pilot pressure operated unloading valve which is freely switched to on-load condition or unloaded condition depending on presence or absence of pilot pressure and a first solenoid operated changeover valve for switching the presence or absence of pilot pressure, and the pressure increasing valve may have a second relief valve which is set at a higher pressure than a first relief valve with a normal set pressure and a second solenoid operated changeover valve for switching the connection with the downstream working machine circuit from the first relief valve to the second relief valve.

According to the above configuration, when inputting an actuating signal from the shift-down switch, the controller switches the first solenoid operated changeover valve and drains discharge oil from the first pump or the second pump by the pilot pressure operated unloading valve. Moreover, when inputting an actuating signal from the shift-down switch, the controller switches the second solenoid operated changeover valve, and connects the working machine circuit downstream of the junction with the assistance circuit to the second relief valve with a high set pressure by switching from the first relief valve with a normal set pressure. Thus, the pressure of the downstream working machine circuit can be increased to the high set pressure. As a result, the configurations of the unloading valve and pressure increasing valve which are controlled by the controller can be simplified.

Furthermore, it is suitable that the device includes a work mode switch for selecting a work mode and outputting a signal for switching a hard earth mode or soft earth mode, and that the controller unloads the second pump (or the first pump) by the unloading valve and increases the set pressure of the downstream working machine circuit by the pressure increasing valve when the transmission is shifted down from the second speed gear to the first speed gear on receipt of an actuating signal from the shift-down switch in the case where a signal for the hard earth mode is inputted, and unloads the second pump (or the first pump) by the unloading valve and switches the pressure increasing valve to reduce the set pressure of the downstream working machine circuit to a normal pressure when the transmission is shifted down from the second speed gear to the first speed gear on receipt of an actuating signal from the shift-down switch in the case where a signal for the soft earth mode is inputted.

According to the above configuration, if the work mode switch is switched to the hard earth mode, when the transmission is shifted down from the second speed gear to the first speed gear by the actuating signal from the shift-down switch, the controller unloads the second pump (or the first pump) by the unloading valve and increase the pressure of the downstream working machine circuit by the pressure increasing valve. Meanwhile, if the work mode switch is switched to the soft earth mode, when the transmission is shifted down from the second speed gear to the first speed gear by the actuating signal from the shift-down switch, the controller unloads the second pump (or the first pump) by the unloading valve and sets the downstream working machine circuit to a normal set pressure by the pressure increasing valve. Hence, when earth to be excavated is hard, the same operational effects as in the above configuration can be obtained by switching to the hard earth mode. When earth to be excavated is soft, the downstream working machine circuit is set to the normal set pressure by switching to the soft earth mode, whereby working machine lift force is not increased, resulting in further increase in tractive force. Accordingly, when earth to be excavated is soft, tractive force is increased to increase the quantity of earth scooped into the bucket by switching to the soft earth mode, thus improving excavating efficiency.

BRIEF DESCRIPTION OF THE DRAWINGS

FIG. 7A is an explanatory view when earth to he excavated is soft, and FIG. 7B is an explanatory view when earth to be excavated is hard.

BEST MODE FOR CARRYING OUT THE INVENTION

Preferred embodiments according to the present invention will be explained in detail below with reference to FIG. 1 to FIG. 5. It should be mentioned that the same numerals and symbols will be given to the same elements as those in a prior art shown in FIG. 6, and thus repeated explanation will be omitted.

Figure 1:
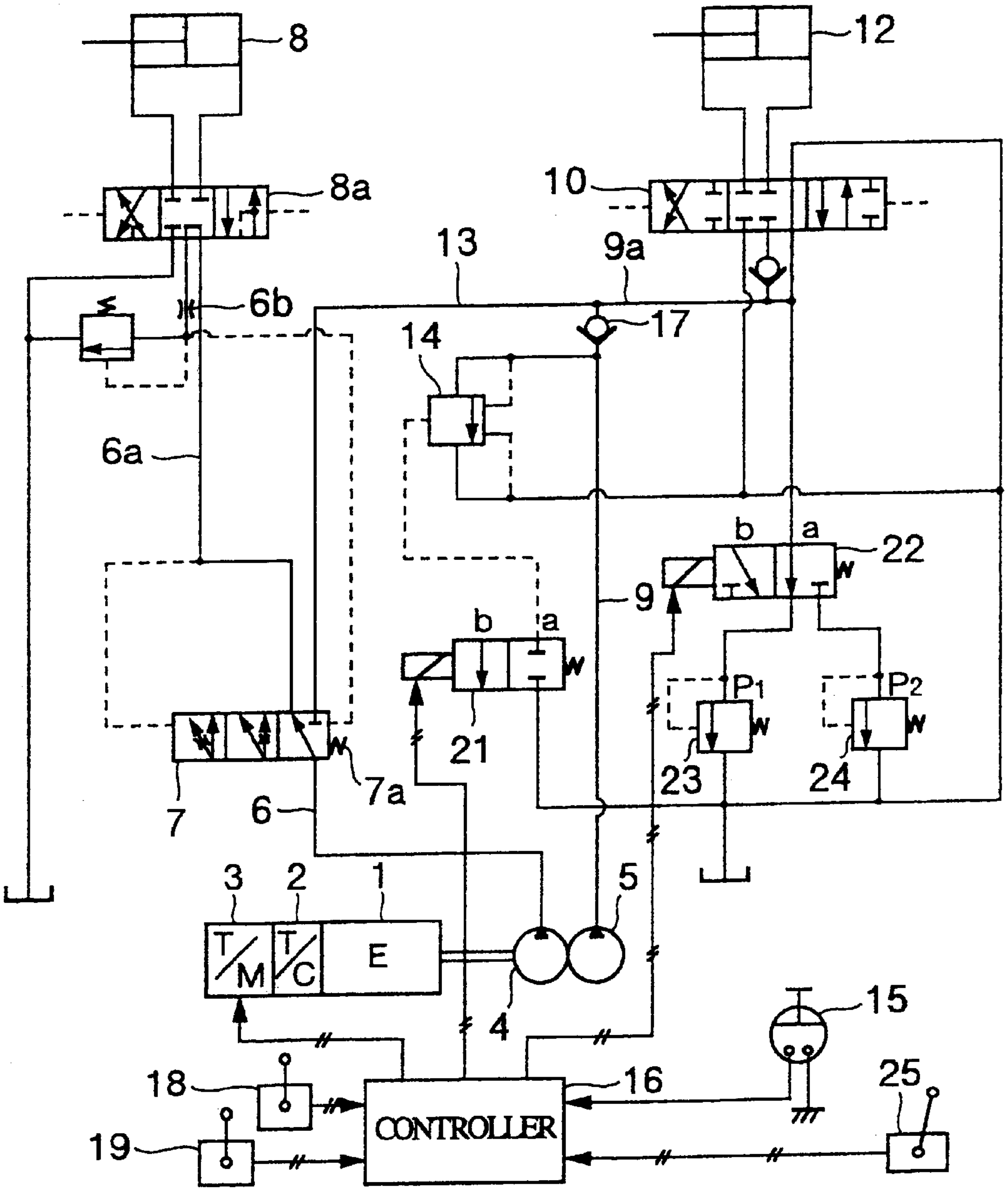
FIG. 1 is a diagram showing the configuration of a first embodiment of the present invention.

A first embodiment will be explained based on FIG. 1. A bucket cylinder 12 is shown as a typical example of a working machine actuator, and a bucket changeover valve 10 is shown as a typical example of the working machine changeover valve 10. In detail, other working machine changeover valves such as a boom changeover valve and the like are connected in parallel with the bucket changeover valve 10 or connected to a by-pass circuit of the bucket changeover valve 10 in series with the bucket changeover valve 10, which is similar to the bucket changeover valve 10, therefore omitting the explanation thereof.

A forwarding and reversing lever 18 outputs signals for shifting a transmission 3 into forward, reverse, and neutral via a controller 16. A speed gear lever 19 outputs signals for shifting the transmission 3 into a first to fourth speed gear via the controller 16. A discharge opening of a first pump 4 is connected to a steering cylinder 8 via a first and a second steering circuit 6 and 6*a*, a steering priority valve 7, and further a steering changeover valve 8*a*.

The configuration and the operation of the steering priority valve 7 is explained now. A flow control restriction 6*b* is provided at a pilot port of the steering changeover valve 8*a*. The upstream side of the flow control restriction 6*b* is connected to a pilot pressure receiving portion on the left side in FIG. 1 of the steering priority valve 7. The downstream side of the flow control restriction 6*b* is connected to a pilot pressure receiving portion on the right side in FIG. 1 of the steering priority valve 7. The right side of the steering priority valve 7 is given momentum by spring force of a spring 7*a*. Therefore, the steering priority valve 7 is controlled so that the differential pressure between the upstream pressure and the downstream pressure of the flow control restriction 6*b* balances with the spring force of the spring 7*a*. However, since the spring force is constant, the differential pressure between the upstream pressure and the downstream pressure of the flow control restriction 6*b*, that is, the flow rate passing through the flow control restriction 6*b* is constant. When the quantity of pressure oil supplied to the flow control restriction 6*b* (the steering changeover valve 8*a*) decreases, the differential pressure between the upstream pressure and the downstream pressure of the flow control restriction 6*b* decreases, whereby the steering) priority valve 7 moves leftward in FIG. 1 by the spring force, and thus the quantity of pressure oil supplied to the steering changeover valve 8*a* increases. As a result, the differential pressure between the upstream pressure and the downstream pressure of the flow control restriction 6*b* increases, and thus the steering priority valve 7 moves rightward from the aforesaid position to which it has moved leftward to a position at which the differential pressure between the upstream pressure and the downstream pressure of the flow control restriction 6*b* balances with the spring force. As described above, the steering, priority valve 7 supplies a specified quantity of discharge oil from the first pump 4 to the steering changeover valve 8*a* and makes the remainder flow to a working machine circuit 9*a* via an assistance circuit 13.

A pilot pressure operated unloading valve 14 which can be freely switched to on-load or unloaded condition depending on the presence or absence of pilot pressure is connected to the working machine circuit 9 upstream of a check valve 17. A first solenoid operated changeover valve 21, which can be freely switched to a position a where communication with a tank is cut off or a position b where communication with the tank is provided, is connected to a pilot line of the pilot pressure operated unloading valve 14. Namely, a second pump 5 can be freely switched to on-load or unloaded condition by the pilot pressure operated unloading valve 14 and the first solenoid operated changeover valve 21. Incidentally, switching to on-load or unloaded condition may be considered to be performed directly by the pilot pressure operated unloading valve 14. Further, the unloading valve 14 is not limited to a pilot pressure operated type. The first solenoid operated changeover valve 21 is switched to the position a when being demagnetized, and switched to the position b when being magnetized on receiving an magnetizing signal from the controller 16 by an actuating signal from a shift-down switch 15. A first relief valve 23 with a normal set pressure P1 (for example, about 21 MPa) and a second relief valve 24 with a high set pressure P2 (for example, about 23 MPa) are connected to the working machine circuit 9*a* downstream of the check valve 17 via a second solenoid operated changeover valve 22. The second solenoid operated changeover valve 22 is switched to a position a where the working machine circuit 9*a* is connected to the first relief valve 23 when being demagnetized. Moreover, the second solenoid operated changeover valve 22 is switched to a position b where the working machine circuit 9*a* is connected to the second relief valve 24, when being magnetized on receiving an magnetizing signal from the controller 16 by an actuating signal from the shift-down switch 15. Namely, the second solenoid operated changeover valve 22 can be freely switched to the position a and the position b. The second solenoid operated changeover valve 22 and the second relief valve 24 compose a pressure increasing valve.

A work mode switch 25 can be freely switched to a soft earth mode and a hard earth mode. When inputting a hard earth mode signal from the work mode switch 25, the controller 16 outputs a magnetizing signal to the second solenoid operated changeover valve 22 following turning on the shift-down switch 15. Meanwhile, when inputting a soft earth mode signal, the controller 16 cuts off the magnetizing signal outputted to the second solenoid operated changeover valve 22 by the actuating signal from the shift-down switch 15.

Next, excavating work in the first embodiment will be explained.

(1) In excavation of soft earth: the work mode switch 25 is switched to the soft earth mode.

(a) When the transmission 3 is in not lower than the second speed gear and the shift-down switch 15 is not turned on: both the first solenoid operated changeover valve 21 and the second solenoid operated changeover valve 22 are in the positions a since the controller 16 does not output any magnetizing signal to the first solenoid operated changeover valve 21 nor the second solenoid operated changeover valve 22. Consequently, the pilot pressure operated unloading valve 14 makes the second pump 5 loaded, and the working machine circuit 9*a* is connected to the first relief valve 23. Discharge oil from the first pump 4 is supplied to the working machine circuit 9*a* via the first steering circuit 6, the steering priority valve 7, and the assistance circuit 13. The discharge oil supplied to the working machine circuit 9*a* joins discharge oil from the second pump 5 supplied via the working machine circuit 9 and the check valve 17, and then is supplied to the bucket changeover valve 10 and the other working machine changeover valves not illustrated such as the boom change over valve and the like. In this situation, the quantity of pressure oil supplied to the working machine circuit 9*a* is large, thus increasing working speed of each working machine. Further, the vehicle speed is as high as the transmission 3 is in not lower than the second speed gear, thereby improving working efficiency by combined control.

(b) When the shift-down switch 15 is turned on to shift the transmission 3 from the second speed gear to the first speed gear to carry out excavation: pilot pressure of the pilot pressure operated unloading valve 14 is drained since the controller 16 outputs a magnetizing signal to the first solenoid operated changeover valve 21 to thereby switch the first solenoid operated changeover valve 21 to the position b. At this time, the controller 16 outputs no magnetizing signal to the second solenoid operated changeover valve 22, whereby the second solenoid operated changeover valve 22 is maintained in the position a. Accordingly, the pilot pressure operated unloading valve 14 unloads the second pump 5, and the working machine circuit 9*a* is continuously connected to the first relief valve 23. As a result, discharge oil from the second pump 5 does not flow into the working machine circuit 9*a*, and only discharge oil from the first pump 4 is supplied to the bucket changeover valve 10 and the other working machine changeover valves not illustrated such as the boom changeover valve and the like via the first steering circuit 6, the steering priority valve 7, the assistance circuit 13, and the working machine circuit 9*a*. The working machine circuit 9*a* is connected to the first relief valve 23 via the position a of the second solenoid operated changeover valve 22, whereby the relief pressure of the working machine circuit 9*a* is the normal set pressure P1. Therefore, even in the same prime mover power, driving force of the second pump 5 which becomes unnecessary in consequence of unload can be appropriated to traction. Thus, the increased tractive force enables a bucket to be dug deep into earth by digging the bucket into soft earth, whereby excavated earth can be scooped into the bucket efficiently.

Consequently, excavating ability is increased and excavating time is shortened, thereby improving working efficiency. If the increase in tractive force used during work is smaller than the driving force of the second pump 5 which becomes unnecessary as the result of unload, this difference in force can be saved in the prime mover power. Moreover, discharge oil from the second pump 5 is drained from the pilot pressure operated unloading valve 14, and does not flow through the neutral position of the bucket changeover valve 10 having larger flow path resistance than the pilot pressure operated unloading valve 14. Hence, power loss due to the flow path resistance of the bucket changeover valve 10 is eliminated, thereby reducing an increase in oil temperature. Especially, a discharge quantity from the second pump 5 is larger than that from the first pump 4, thus obtaining remarkable energy-saving effect.

(2) In excavation of hard earth: the work mode switch 25 is switched to the hard earth mode.

(a) When the transmission 3 is in not lower than the second speed gear and the shift-down switch 15 is not turned on: the work is the same as in an item (a) in the aforesaid excavation of soft earth, thus omitting the explanation thereof.

(b) When the shift-down switch 15 is turned on to shift the transmission 3 from the second speed gear to the first speed gear to carry out excavation: the controller 16 outputs magnetizing signals to the first solenoid operated changeover valve 21 and the second solenoid operated changeover valve 22 to switch both the first solenoid operated changeover valve 21 and the second solenoid operated changeover valve 22 to the positions b. Therefore, the pilot pressure operated unloading valve 14 unloads the second pump 5, and the working machine circuit 9*a* is connected to the second relief valve 24. As a result, discharge oil from the second pump 5 does not flow into the working machine circuit 9*a*, and only discharge oil from the first pump 4 is supplied to the bucket changeover valve 10 and the other working machine changeover valves not illustrated such as the boom changeover valve and the like via the first steering circuit 6, the steering priority valve 7, the assistance circuit 13, and the working machine circuit 9*a*. The working machine circuit 9*a* is connected to the second relief valve 24 via the position b of the second solenoid operated changeover valve 22, whereby the relief pressure of the working machine circuit 9*a* is the high set pressure P2. Accordingly, the tractive force can be increased by the force corresponding to the driving force of the second pump 5 which becomes unnecessary in consequence of unload out of prime mover power, and the pressure of the working machine circuit 9*a* is raised from the normal set pressure P1 of the first relief valve 23 to the high set pressure P2 of the second relief valve 24, thereby increasing working machine lift force Fv such as bucket tilt force or the like.

Consequently, even when earth is not fully broken by only digging the bucket into the earth with tractive force since the earth is hard, the working machine lift force Fv such as the bucket tilt force, boom lift force, or the like is increased to increase the tractive force while a bucket edge is repeatedly raised, whereby the earth is efficiently broken and the quantity of earth scooped into the bucket is increased. As a result, excavating ability is enhanced, thus shortening the excavating time and improving working efficiency. When the total of increases in tractive force and working machine lift force used during work is smaller than the driving force of the second pump 5 which becomes unnecessary as the result of unload, this difference in force can be saved in the prime mover power. Further, in excavation when earth is hard, the road surface is slippery, or the like, the tractive force is increased while the working machine lift force is increased, thereby efficiently breaking earth and sand to be excavated and increasing the quantity of earth scooped into the bucket. Consequently, abrasion loss due to tire slips is reduced, thus lengthening the life of a tire. It should be noted that explanation on effects produced because discharge oil from the second pump 5 is drained from the pilot pressure operated unloading valve 14 and power loss due to flow path resistance of the bucket changeover valve 10 is eliminated, is omitted since the effect is the same as in the aforesaid item (b).

Figure 2:
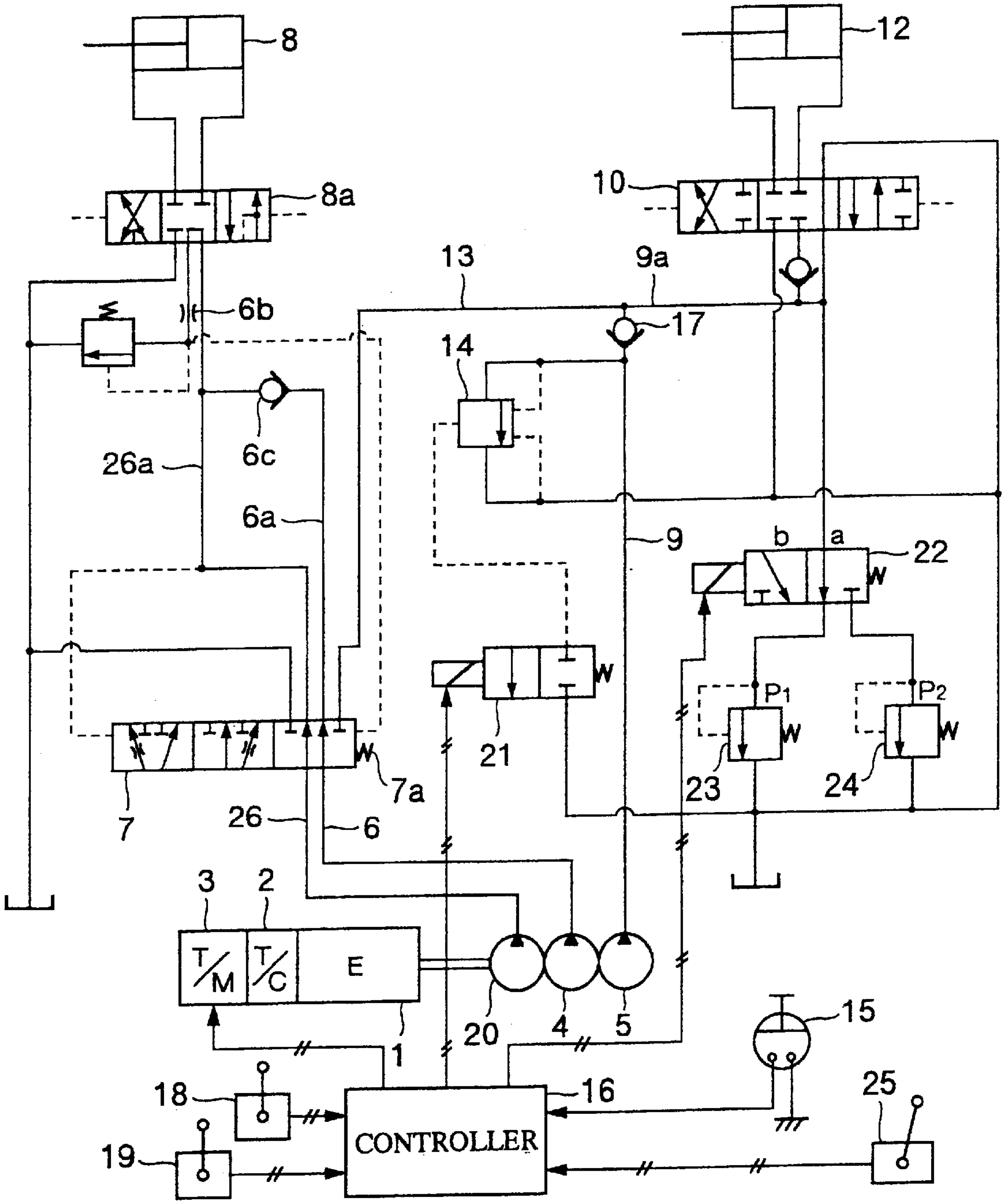
FIG.2 is a diagram showing the configuration of a second embodiment of the present invention.

A second embodiment will be explained with FIG. 2. A third pump 20 is added to the first pump 4 and the second pump 5 in the first embodiment shown in FIG. 1. In the first embodiment, a port provided in the steering priority valve 7, that is, the port connecting the first steering circuit 6, the second steering circuit 6*a*, and the assistance circuit 13 is provided. In the second embodiment, a port connecting a first steering dedicated circuit 26, a second steering dedicated circuit 26*a*, and a drain is additionally formed. A discharge opening of the third pump 20 is connected to the first steering dedicated circuit 26, and the second steering dedicated circuit 26*a* is connected to the second steering circuit 6*a*. The second steering circuit 6*a* is provided with a check valve 6*c* for checking flow toward the steering priority valve 7 on the upstream side of a portion thereof connected with the second steering dedicated circuit 26*a*. The other configuration is the same as that of the first embodiment, and hence the same numerals and symbols will be given to the same elements, and repeated explanation is omitted.

According to the configuration of the second embodiment, discharge oil from the third pump 20 is supplied to the second steering circuit 6*a* via the first steering dedicated circuit 26 and the steering priority valve 7. Therefore, in the same manner as in the first embodiment, the steering priority valve 7 is controlled so that the total of part of discharge oil from the first pump 4 which flows into the second steering circuit 6*a* and part of discharge oil from the third pump 20 which flows into the second steering dedicated circuit 26*a* is constant. Thus, a specified quantity of discharge oil from the first pump 4 and the third pump 20 is preferentially supplied to the steering changeover valve 8*a* by the steering priority valve 7. The other operation and effects are the same as in the first embodiment, thus omitting the explanation thereof.

Incidentally, although the steering priority valve 7 is provided between the first and the second steering dedicated circuit 26 and 26*a* in the second embodiment, the first steering dedicated circuit 26 and the second steering dedicated circuit 26*a* may be connected directly with each other, separately from the steering priority valve 7.

Figure 3:
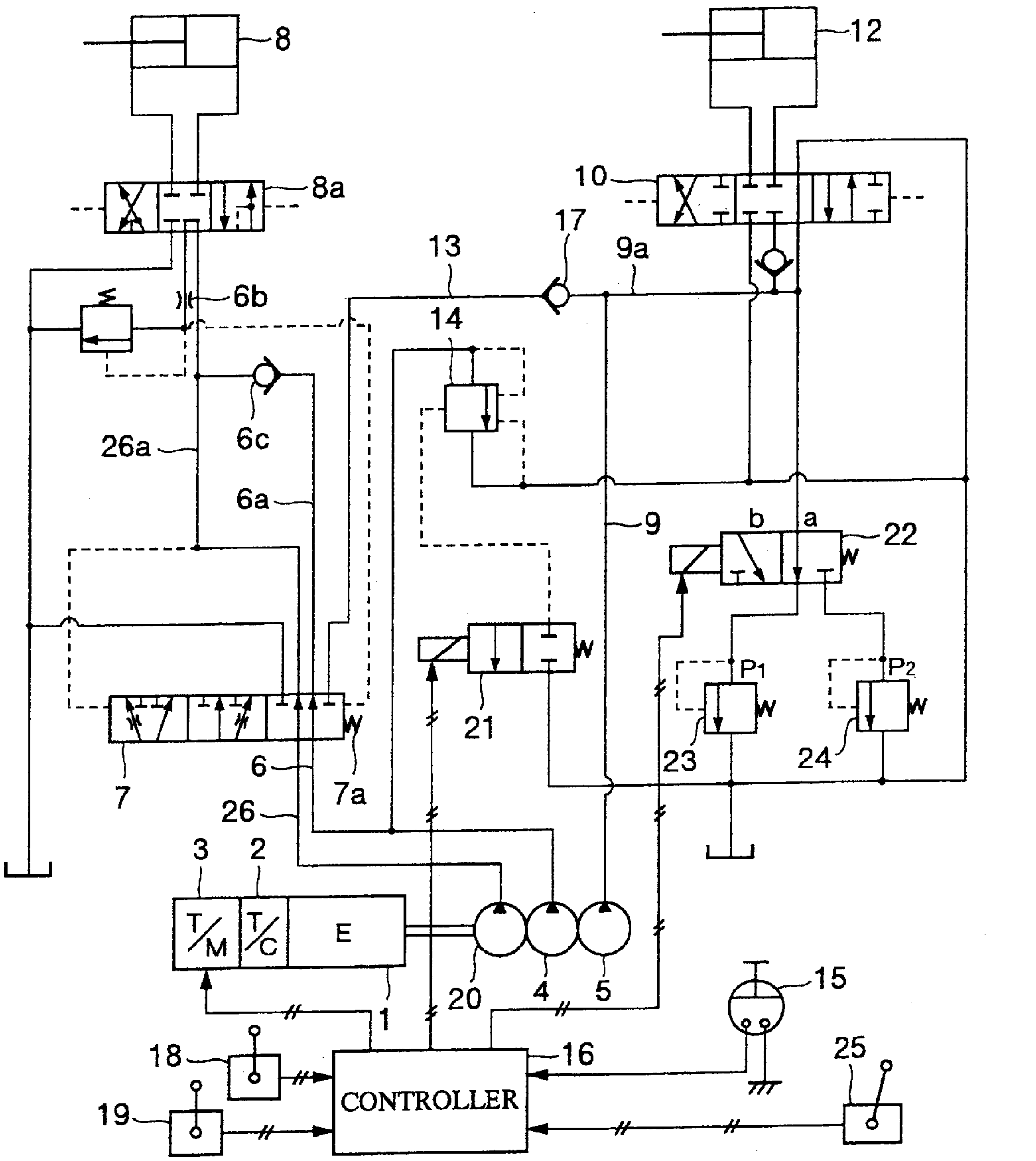
FIG. 3 is a diagram showing the configuration of a third embodiment of the present invention.

A third embodiment shown in FIG. 3 will be explained. In the second embodiment, the pilot pressure operated unloading valve 14 is connected upstream of the check valve 17 provided in the working machine circuit 9 to switch the second pump 5 from/to on-load condition to/from unloaded condition, while in the third embodiment, the pilot pressure operated unloading valve 14 is connected to the first steering circuit 6 to switch the first pump 4 from/to on-load condition to/from unloaded condition. The assistance circuit 13 is provided with the check valve 17 for checking the flow of pressure oil toward the steering priority valve 7 therein. The other configuration is the same as that of the second embodiment.

According to the configuration of the third embodiment, even if the first pump 4 is unloaded by the pilot pressure operated unloading valve 14, the back-flow of pressure oil in the working machine circuit 9, 9*a* toward the pilot pressure operated unloading valve 14 is checked by the check valve 17. Likewise, the back-flow of pressure oil in the second steering dedicated circuit 26*a* toward the pilot pressure operated unloading valve 14 is checked by the check valve 6*c*. A discharge quantity from the first pump 4 is smaller than that from the second pump 5, whereby increases in tractive force and working machine lift force are less compared with the second embodiment. In the third embodiment, however, high working machine speed can be maintained by a discharge quantity from the second pump 5, thus keeping high working efficiency. The other operation and effects are the same as in the second embodiment.

Figure 4:
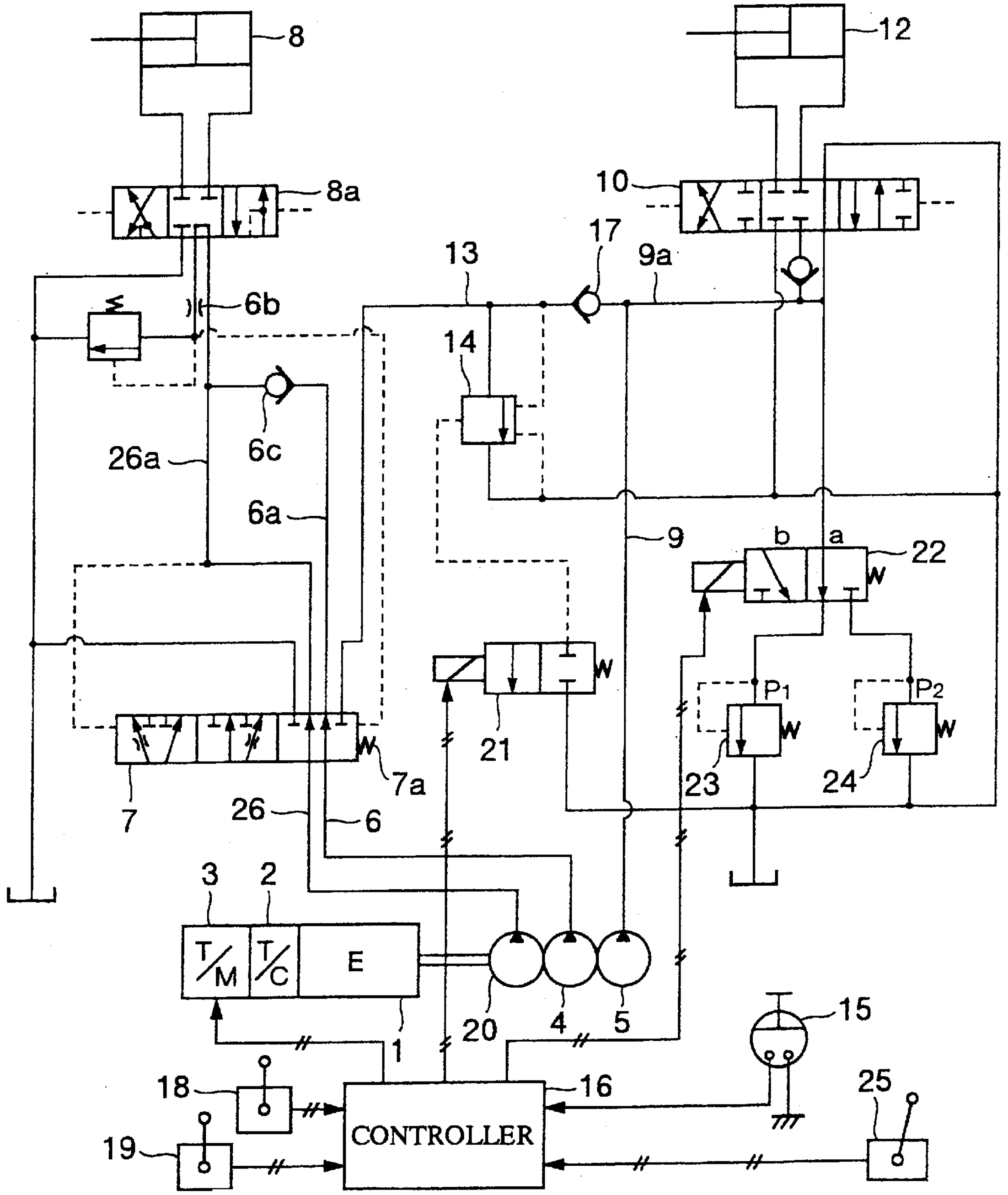
FIG. 4 is a diagram showing the configuration of a fourth embodiment of the present invention.

A fourth embodiment shown in FIG. 4 will be explained. In the third embodiment, the pilot pressure operated unloading valve 14 is connected to the first steering circuit 6, whereas in the fourth embodiment, the pilot pressure operated unloading valve 14 is connected to the assistance circuit 13, and the check valve 17 is provided downstream of a connecting portion of the pilot pressure operated unloading valve 14. The other configuration is the same as that of the third embodiment.

In the aforesaid third embodiment, discharge oil from the first pump 4 is all drained by the pilot pressure operated unloading valve 14. According to the configuration of the fourth embodiment, however, only part of discharge oil from the first pump 4, which flows into the assistance circuit 13, is drained, but discharge oil flowing through the first steering circuit 6 is not drained, whereby the first pump 4 is not unloaded. Accordingly, unlike the first to third embodiments, there is no driving force of a pump which becomes unnecessary in consequence of unload. However, working machine lift force can be increased by raising the pressure of pressure oil in the working machine circuit. Prime mover power can be increased or tractive force can be decreased in accordance with this increase. The aforesaid control enables working ability of work which specially needs working machine lift force to increase, thus improving working efficiency. Further, in the fourth embodiment, part of discharge oil from the first pump 4 which flows into the assistance circuit 13 is drained from the pilot pressure operated unloading valve 14, thereby eliminating power loss due to the flow path resistance of the bucket changeover valve 10 and thus preventing an increase in oil temperature.

Figure 5:
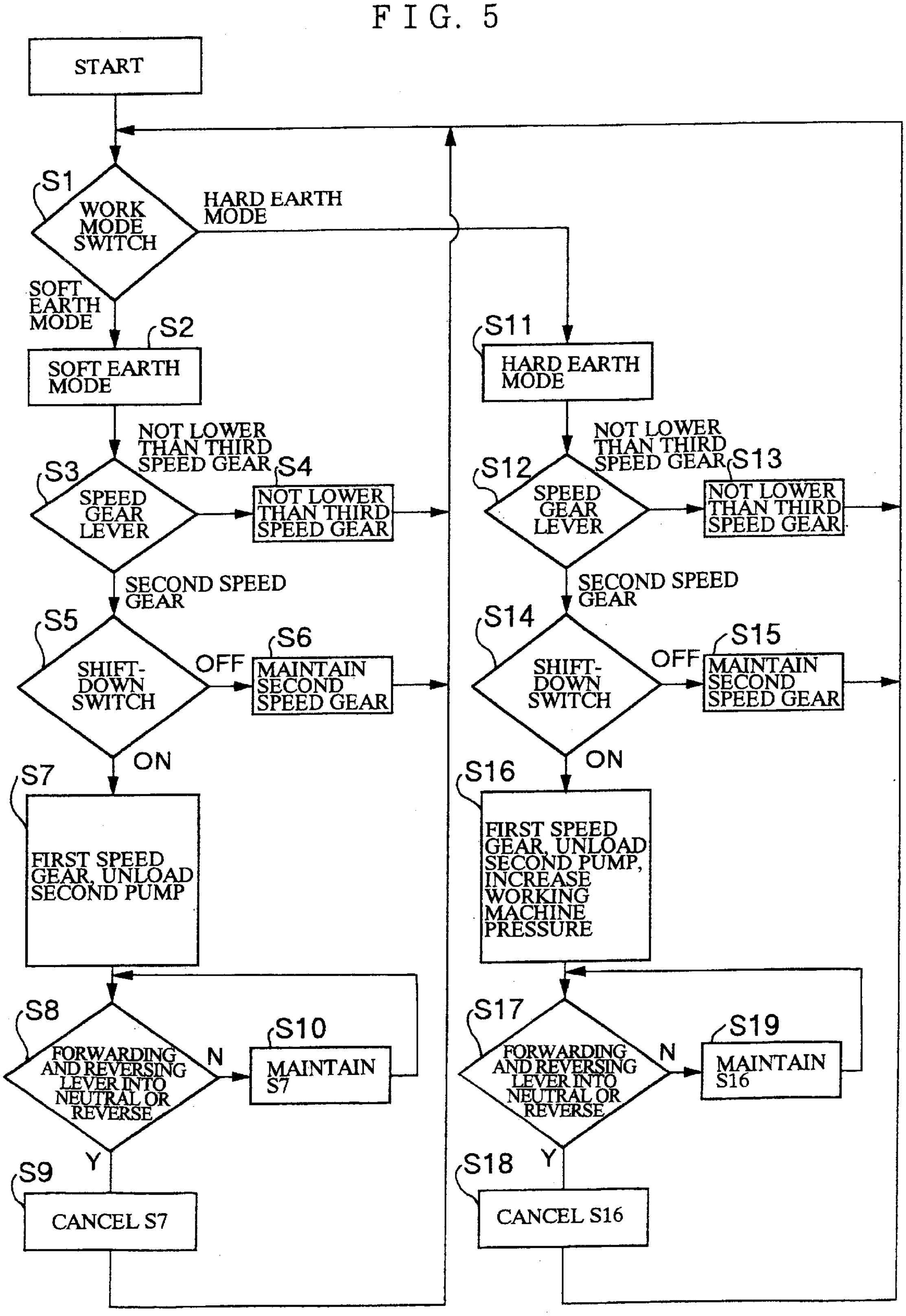
FIG. 5 is a flowchart regarding control in the first and second embodiments of the present invention.
Figure 6:
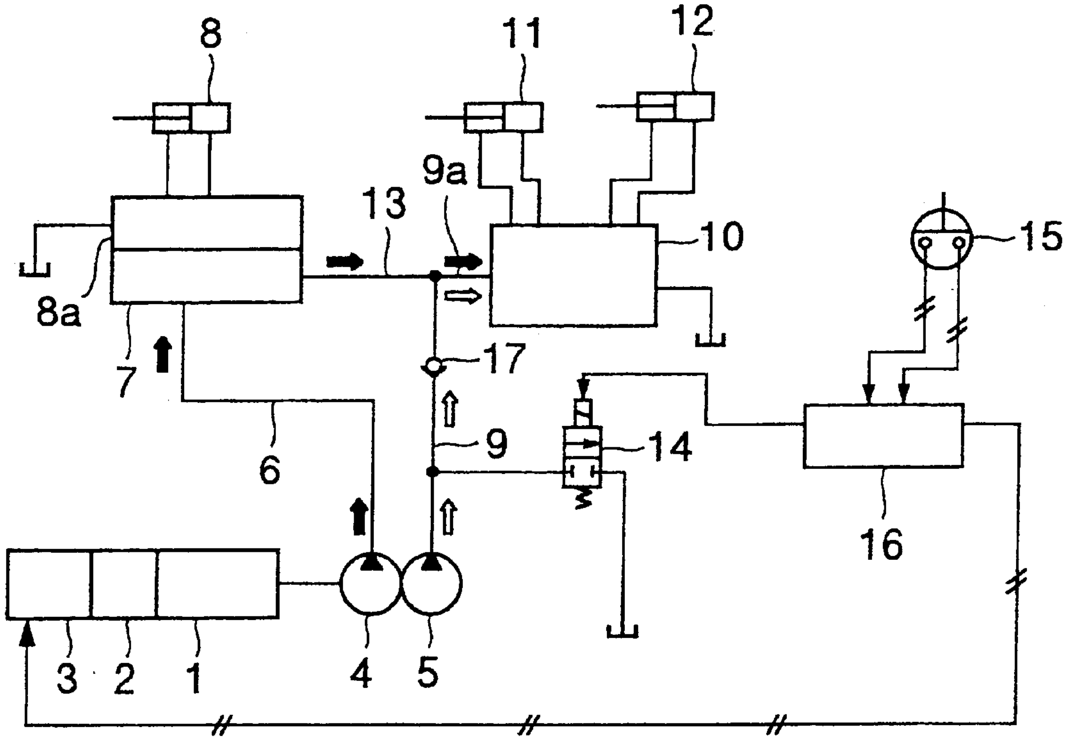
F I G. 6 PRIOR ART
FIG. 6 is a diagram showing a prior art.
Figure 7A:
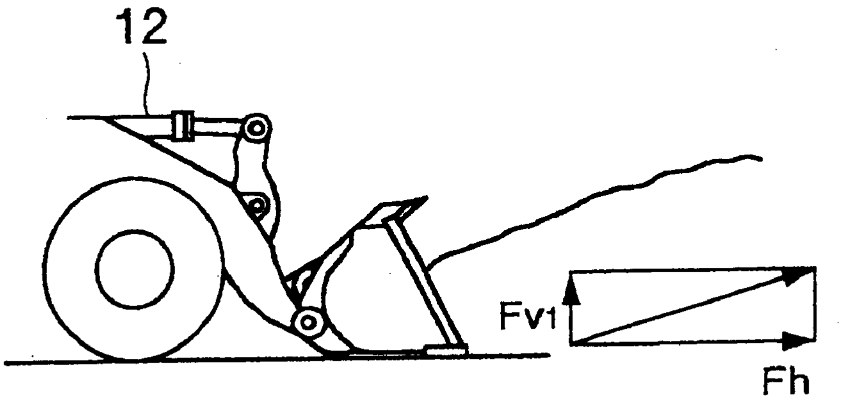
FIG. 7A and FIG. 7B are explanatory views of the principle of force exerted on a bucket of a wheel loader.
Figure 7B:
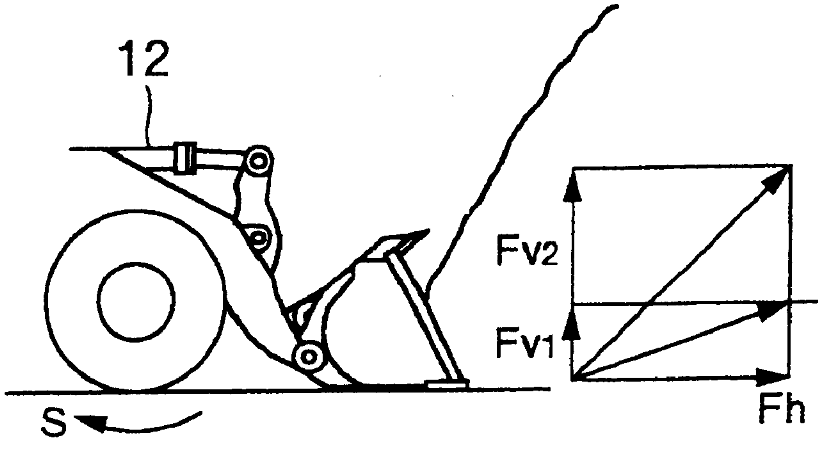

A flowchart of the first and second embodiments shown in FIG. 5 will be explained. It should be noted that a flowchart of the third and fourth embodiments is the same as in FIG. 5, thus omitting the explanation thereof.

(1) In the Case of the Soft Earth Mode (the Prior Art)

In the case where earth to be excavated is soft, when the work mode switch 25 is initially set at the soft earth mode in step S1, the procedure advances to step S2 and the soft earth mode is provided. Next, when the speed gear lever 19 is in not lower than the third speed gear in step S3, the procedure advances to step S4 to shift the transmission 3 to the corresponding speed gear and demagnetize the first and second solenoid operated changeover valves 21 and 22, and then returns to step S1. When the speed gear lever 19 is in the second speed gear in step S3, the procedure advances to step S5. When the shift-down switch 15 is OFF in step S5, the procedure advances to step S6 to maintain the transmission 3 in the second speed gear and demagnetize the first and second solenoid operated changeover valves 21 and 22, and then returns to step S1. When the shift-down switch 15 is ON in step S5, the procedure advances to step S7. In step S7, a signal for shifting into the first speed gear is outputted to shift the transmission 3 to the first speed gear, and a signal for magnetizing the first solenoid operated changeover valve 21 is outputted to unload the second pump 5 by means of the pilot pressure operated unloading valve 14, whereas the second solenoid operated changeover valve 22 remains demagnetized. When the forwarding and reversing lever 18 is manipulated into neutral or reverse in step S8, the procedure advances to step S9, and after respective signals outputted in step S7 are canceled, the procedure returns to step S1. If the forwarding and reversing lever 18 is not manipulated into neutral or reverse in step S8, the procedure advances to step S10, and then returns to step S8 while respective signals outputted in step S7 remain outputted.

(2) In the Case of the Hard Earth Mode (the Art of the Present Invention)

In the case where earth to be excavated is hard, when the work mode switch 25 is initially set at the hard earth mode in step S1, the procedure advances to step S11 and the soft earth mode is provided. Next, when the speed gear lever 19 is in not lower than the third speed gear in step S12, the procedure advances to step S13 to shift the transmission 3 to the corresponding speed gear and demagnetize the first and second solenoid operated changeover valves 21 and 22, and then returns to step S1. When the speed gear lever 19 is in the second speed gear in step S12, the procedure advances to step S14. When the shift-down switch 15 is OFF in step S14, the procedure advances to step S15 to maintain the transmission 3 in the second speed gear and demagnetize the first and second solenoid operated changeover valves 21 and 22, and then returns to step S1. When the shift-down switch 15 is ON in step S14, the procedure advances to step S16. In step S16, a signal for shifting into the first speed gear is outputted to shift the transmission 3 to the first speed gear. At the same time, a signal for magnetizing the first solenoid operated changeover valve 21 is outputted to unload the second pump 5 by the pilot pressure operated unloading valve 14, and a signal for magnetizing the second solenoid operated changeover valve 22 is outputted to switch the working machine circuit 9*a* from the first relief valve 23 with the normal set pressure P1 to the second relief valve 24 with the high set pressure P2. Next, when the forwarding and reversing lever 18 is manipulated into neutral or reverse in step S17, the procedure advances to step S18, and after respective signals outputted in step S16 are canceled, the procedure returns to step S1. If the forwarding and reversing lever 18 is not manipulated into neutral or reverse in step S17, the procedure advances to step S19, and then returns to step S17 while respective signals outputted in step S16 remain outputted.

As explained above, according to the present invention, in excavation, the pump is unloaded according to a speed by which the working machine speed can be reduced, and the set pressure of the working machine circuit is increased, thereby increasing tractive force and working machine lift force corresponding to drive force of the pump which becomes unnecessary as the result of unload. Thus, even when earth and sand to be excavated are not fully broken by only digging the bucket into the earth and sand with tractive force since the earth to be excavated is hard, the tractive force is increased while working machine lift force such as boom lift force, bucket tilt force, or the like, whereby the earth becomes easy to fully break and can be efficiently excavated, resulting in an increase in quantity of earth scooped into the bucket. As a result, excavating ability is enhanced and excavating time is shortened, thereby improving working efficiency. Further, in excavation when earth and sand to be excavated are hard, the road surface is slippery, or the like, if the tractive force is increased while the working machine lift force is increased, and the quantity of earth scooped into the bucket is increased by efficiently breaking the sand and earth to be excavated, abrasion loss due to tire slips is reduced, thus lengthening the life of a tire. Furthermore, discharge oil from the pump is drained from the pilot pressure operated unloading valve, thereby preventing power loss in the neutral position of the working machine changeover valve having larger flow path resistance than the pilot pressure operated unloading valve and hence saving resources.

What is claimed is:

1. A hydraulic control device for a working vehicle including a transmission, a first pump, and a second pump which are driven by a prime mover, a steering circuit for controlling discharge oil from said first pump by a steering priority valve and supplying the same preferentially to a steering changeover valve, a working machine circuit for supplying discharge oil from said second pump to a working machine changeover valve, an assistance circuit for making the remainder of discharge oil from said first pump controlled by said steering priority valve join said working machine circuit, and a shift-down switch for shifting down said transmission to a first speed gear when being operated while said transmission is in a second speed gear, comprising:

an unloading valve (14), connected to said working machine circuit (9) upstream of a junction of said working machine circuit (9, 9*a*) and said assistance circuit (13), for allowing discharge oil from said second pump (5) to be freely drained;

a pressure increasing valve (22, 24), connected to said working machine circuit (9*a*) downstream of said junction, for increasing a set pressure of pressure oil in said downstream working machine circuit (9*a*);

a check valve (17), provided in said upstream working machine circuit (9) between a portion connected to said unloading valve (14) and said junction, for checking back-flow of the pressure oil in said downstream working machine circuit (9*a*) toward said unloading valve (14); and a controller (16) for draining discharge oil from said second pump (5) by said unloading valve (14) and increasing the set pressure of said downstream working machine circuit (9*a*) by said pressure increasing valve (22, 24) when said transmission (3) is shifted down from the second speed gear to the first speed gear on receipt of an actuating signal from said shift-down switch (15).

2. A hydraulic control device for a working vehicle including a transmission, a first pump, a second pump, and a third pump which are driven by a prime mover, a steering circuit for controlling discharge oil from said first pump by a steering priority valve and supplying the same preferentially to a steering changeover valve, a working machine circuit for supplying discharge oil from said second pump to a working machine changeover valve, an assistance circuit for making the remainder of discharge oil from said first pump controlled by said steering priority valve join said working machine circuit, a steering dedicated circuit for making discharge oil from said third pump join said steering circuit downstream of said steering priority valve, and a shift-down switch for shifting down said transmission to a first speed gear when being operated while said transmission is in a second speed gear, comprising:

an unloading valve (14), connected to a circuit (6, 13) which connects a junction of said working machine circuit (9, 9*a*) and said assistance circuit (13) and said first pump (4) and includes said assistance circuit (13), for allowing discharge oil from said first pump (4) to be freely drained;

a pressure increasing valve (22, 24), connected to said working machine circuit (9*a*) downstream of said junction, for increasing a set pressure of pressure oil in said downstream working machine circuit (9*a*);

a check valve (17), provided in said connecting circuit (6, 13) between a portion connected to said unloading valve (14) and said junction, for checking back-flow of the pressure oil in said downstream working machine circuit (9*a*) toward said unloading valve (14); and a controller (16) for draining discharge oil from said first pump (4) by said unloading valve (14) and increasing the set pressure of said downstream working machine circuit (9*a*) by said pressure increasing valve (22, 24) when said transmission (3) is shifted down from the second speed gear to the first speed gear on receipt of an actuating signal from said shift-down switch (15).

3. A hydraulic control device for a working vehicle, including a transmission, a first pump, and a second pump which are driven by a prime mover, a steering circuit for controlling discharge oil from said first pump by a steering priority valve and supplying the same preferentially to a steering changeover valve, a working machine circuit for supplying discharge oil from said second pump to a working machine changeover valve, an assistance circuit for making the remainder of discharge oil from said first pump controlled by said steering priority valve join said working machine circuit, and a shift-down switch for shifting down said transmission to a first speed gear when being operated while said transmission is in a second speed gear, comprising:

an unloading valve (14), connected to said working machine circuit (9) upstream of a junction of said working machine circuit (9, 9*a*) and said assistance circuit (13), for allowing discharge oil from said second pump (5) to be freely drained;

a pressure increasing valve (22, 24), connected to said working machine circuit (9*a*) downstream of said junction, for increasing a set pressure of pressure oil in said downstream working machine circuit (9*a*);

a check valve (17), provided in said upstream working machine circuit (9) between a portion connected to said unloading valve (14) and said junction, for checking back-flow of the pressure oil in said downstream working machine circuit (9*a*) toward said unloading valve(14); and a controller (16) for draining discharge oil from said second pump (5) by said unloading valve (14) and increasing the set pressure of said downstream working machine circuit (9*a*) by said pressure increasing valve (22, 24) when said transmission (3) is shifted down from the second speed gear to the first speed gear on receipt of an actuating signal from said shift-down switch (15);

wherein said unloading valve (14) has a pilot pressure operated unloading valve (14) which is freely switched to onload condition or unloaded condition depending on presence or absence of pilot pressure and a first solenoid operated changeover valve (21) for switching said presence or absence of pilot pressure, and wherein said pressure increasing valve (22, 24) has a second relief valve (24) which is set at a higher pressure than a first relief valve (23) with normal set pressure and a second solenoid operated changeover valve (22) for switching the connection with said downstream working machine circuit (9$a$) from said first relief valve (23) to said second relief valve (24).

4. A hydraulic control device for a working vehicle, including a transmission, a first pump, and a second pump which are driven by a prime mover, a steering circuit for controlling discharge oil from said first pump by a steering priority valve and supplying the same preferentially to a steering changeover valve, a working machine circuit for supplying discharge oil from said second pump to a working machine changeover valve, an assistance circuit for making the remainder of discharge oil from said first pump controlled by said steering priority valve join said working machine circuit, and a shift-down switch for shifting down said transmission to a first speed gear when being operated while said transmission is in a second speed gear, comprising:

an unloading valve (14), connected to said working machine circuit (9) upstream of a junction of said working machine circuit (9, 9$a$) and said assistance circuit (13), for allowing discharge oil from said second pump (5) to be freely drained;

a pressure increasing valve (22, 24), connected to said working machine circuit (9$a$) downstream of said junction, for increasing a set pressure of pressure oil in said downstream working machine circuit (9$a$);

a check valve (17), provided in said upstream working machine circuit (9) between a portion connected to said unloading valve (14) and said junction, for checking back-flow of the pressure oil in said downstream working machine circuit (9$a$) toward said unloading valve (14);

a controller (16) for draining discharge oil from said second pump (5) by said unloading valve (14) and increasing the set pressure of said downstream working machine circuit (9$a$) by said pressure increasing valve (22, 24) when said transmission (3) is shifted down from the second speed gear to the first speed gear on receipt of an actuating signal from said shift-down switch (15); and a work mode switch (25) for selecting a work mode and outputting a signal for switching a hard earth mode or soft earth mode, wherein said controller (16)

unloads said second pump (5) by said unloading valve (14) and increases the set pressure of said downstream working machine circuit (9$a$) by said pressure increasing valve (22, 24) when said transmission (3) is shifted down from the second speed gear to the first speed gear on receipt of an actuating signal from said shift-down switch (15) in the case where a signal for said hard earth mode is inputted, and unloads said second pump (5) by said unloading valve (14) and switches said pressure increasing valve (22, 24) to reduce the set pressure of said downstream working machine circuit (9$a$) to a normal pressure when said transmission (3) is shifted down from the second speed gear to the first speed gear on receipt of an actuating signal from said shift-down switch (15) in the case where a signal for said soft earth mode is inputted.

5. A hydraulic control device for a working vehicle, including a transmission, a first pump, a second pump, and a third pump which are driven by a prime mover, a steering circuit for controlling discharge oil from said first pump by a steering priority valve and supplying the same preferentially to a steering changeover valve, a working machine circuit for supplying discharge oil from said second pump to a working machine changeover valve, an assistance circuit for making the remainder of discharge oil from said first pump controlled by said steering priority valve join said working machine circuit, a steering dedicated circuit for making discharge oil from said third pump join said steering circuit downstream of said steering priority valve, and a shift-down switch for shifting down said transmission to a first speed gear when being operated while said transmission is in a second speed gear, comprising:

an unloading valve (14), connected to a circuit (6, 13) which connects a junction of said working machine circuit (9, 9$a$) and said assistance circuit (13) and said first pump (4) and includes said assistance circuit (13), for allowing discharge oil from said first pump (4) to be freely drained;

a pressure increasing valve (22, 24), connected to said working machine circuit (9$a$) downstream of said junction, for increasing a set pressure of pressure oil in said downstream working machine circuit (9$a$);

a check valve (17), provided in said connecting circuit (6, 13) between a portion connected to said unloading valve (14) and said junction, for checking back-flow of the pressure oil in said downstream working machine circuit (9$a$) toward said unloading valve (14);

a controller (16) for draining discharge oil from said first pump (4) by said unloading valve (14) and increasing the set pressure of said downstream working machine circuit (9$a$) by said pressure increasing valve (22, 24) when said transmission (3) is shifted down from the second speed gear to the first speed gear on receipt of an actuating signal from said shift-down switch (15); and a work mode switch (25) for selecting a work mode and outputting a signal for switching a hard earth mode or soft earth mode, wherein said controller (16)

unloads said first pump (4) by said unloading valve (14) and increases the set pressure of said downstream working machine circuit (9$a$) by said pressure increasing valve (22, 24) when said transmission (3) is shifted down from the second speed gear to the first speed gear on receipt of an actuating signal from said shift-down switch (15) in the case where a signal for said hard earth mode is inputted, and unloads said first pump (4) by said unloading valve (14) and switches said pressure increasing valve (22, 24) to reduce the set pressure of said downstream working machine circuit (9*a*) to a normal pressure when said transmission (3) is shifted down from the second speed gear to the first speed gear on receipt of an actuating signal from said shift-down switch (15) in the case where a signal for said soft earth mode is inputted.

6. A hydraulic control device for a working vehicle including a transmission, a first pump, a second pump, and a third pump which are driven by a prime mover, a steering circuit for controlling discharge oil from said first pump by a steering priority valve and supplying the same preferentially to a steering changeover valve, a working machine circuit for supplying discharge oil from said second pump to a working machine changeover valve, an assistance circuit for making the remainder of discharge oil from said first pump controlled by said steering priority valve join said working machine circuit, a steering dedicated circuit for making discharge oil from said third pump join said steering circuit downstream of said steering priority valve, and a shift-down switch for shifting down said transmission to a first speed gear when being operated while said transmission is in a second speed gear, comprising:

an unloading valve (14), connected to a circuit (6, 13) which connects a junction of said working machine circuit (9, 9*a*) and said assistance circuit (13) and said first pump (4) and includes said assistance circuit (13), for allowing discharge oil from said first pump (4) to be freely drained;

a pressure increasing valve (22, 24), connected to said working machine circuit (9*a*) downstream of said junction, for increasing a set pressure of pressure oil in said downstream working machine circuit (9*a*);

a check valve (17), provided in said connecting circuit (6, 13) between a portion connected to said unloading valve (14) and said junction, for checking backflow of the pressure oil in said downstream working machine circuit (9*a*) toward said unloading valve (14); and a controller (16) for draining discharge oil from said first pump (4) by said unloading valve (14) and increasing the set pressure of said downstream working machine circuit (9*a*) by said pressure increasing valve (22, 24) when said transmission (3) is shifted down from the second speed gear to the first speed gear on receipt of an actuating signal from said shift-down switch (15);

wherein said unloading valve (14) has a pilot pressure operated unloading valve (14) which is freely switched to unload condition or unloaded condition depending on presence or absence of pilot pressure and a first solenoid operated changeover valve (21) for switching said presence or absence of pilot pressure, and wherein said pressure increasing valve (22, 24) has a second relief valve (24) which is set at a higher pressure than a first relief valve (23) with normal set pressure and a second solenoid operated changeover valve (22) for switching the connection with said downstream working machine circuit (9*a*) from said first relief valve (23) to said second relief valve (24).

* * * * *